April 28, 1959     J. W. VAN RIPER     2,883,702
PULL-THROUGH LEADER SEAL
Filed Sept. 12, 1956     3 Sheets–Sheet 1
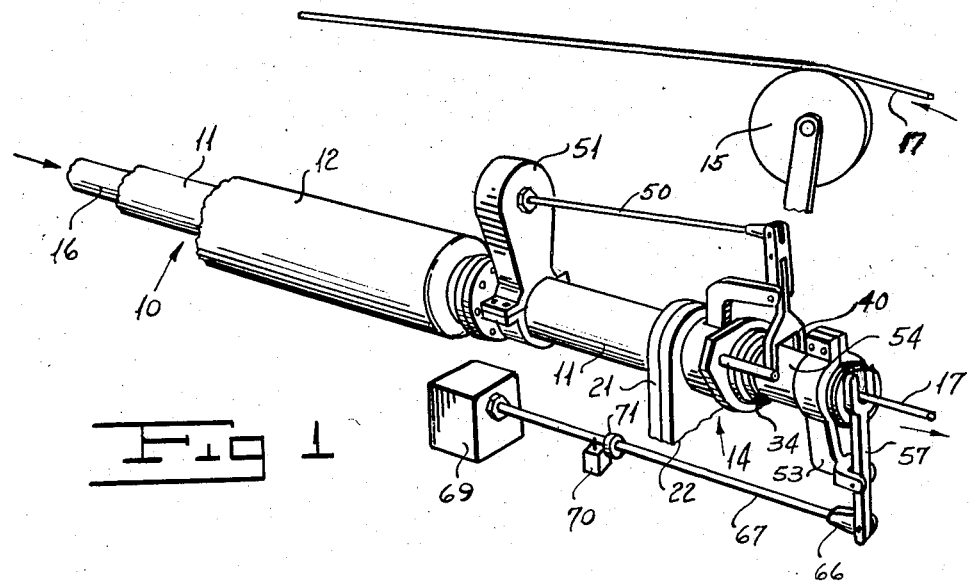
INVENTOR
JURIAN W. VAN RIPER
BY Alfred W. Vibber
ATTORNEY April 28, 1959
J. W. VAN RIPER
2,883,702
PULL-THROUGH LEADER SEAL
Filed Sept. 12, 1956
3 Sheets-Sheet 2
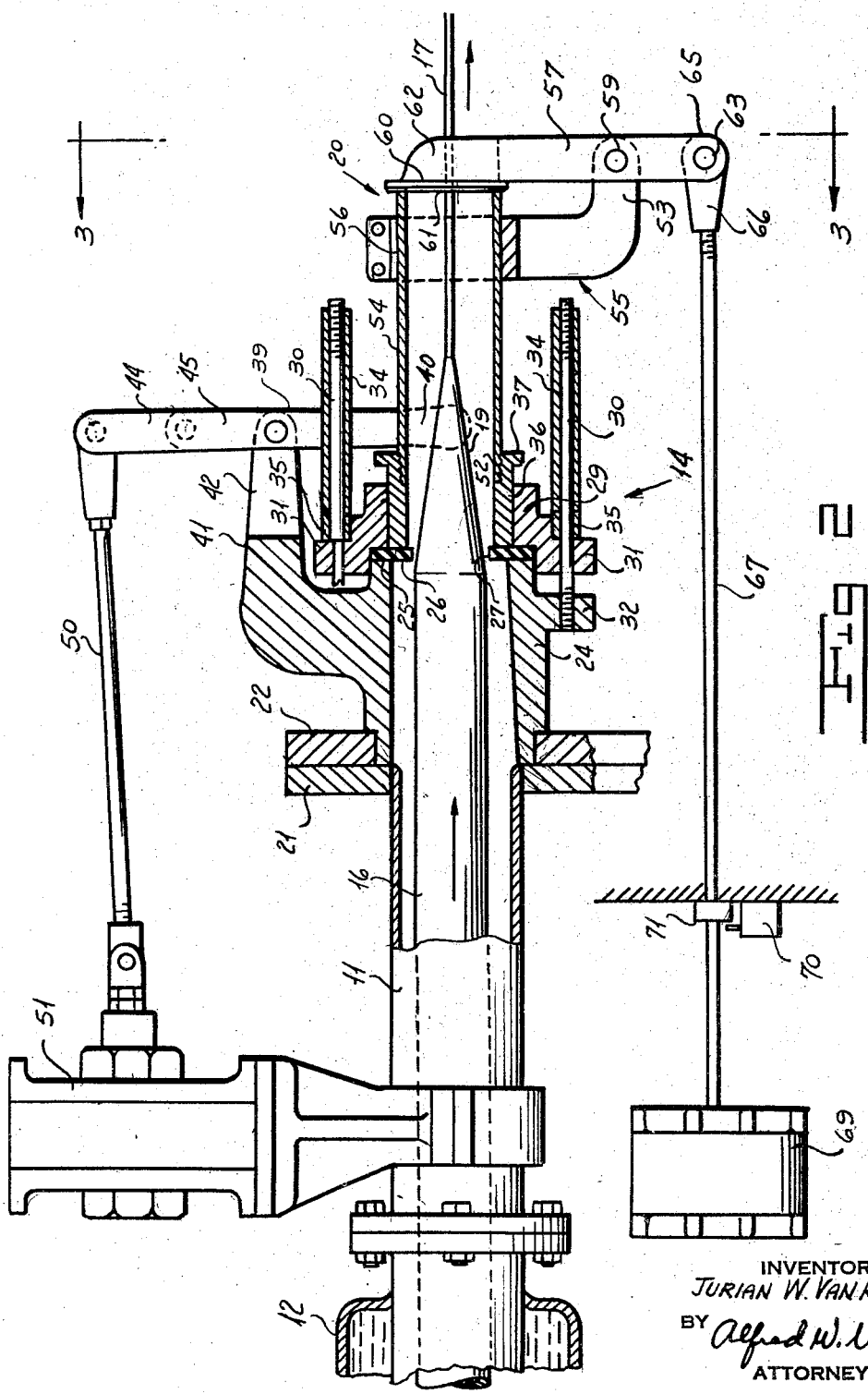
INVENTOR
JURIAN W. VAN RIPER
BY Alfred W. Nibber
ATTORNEY

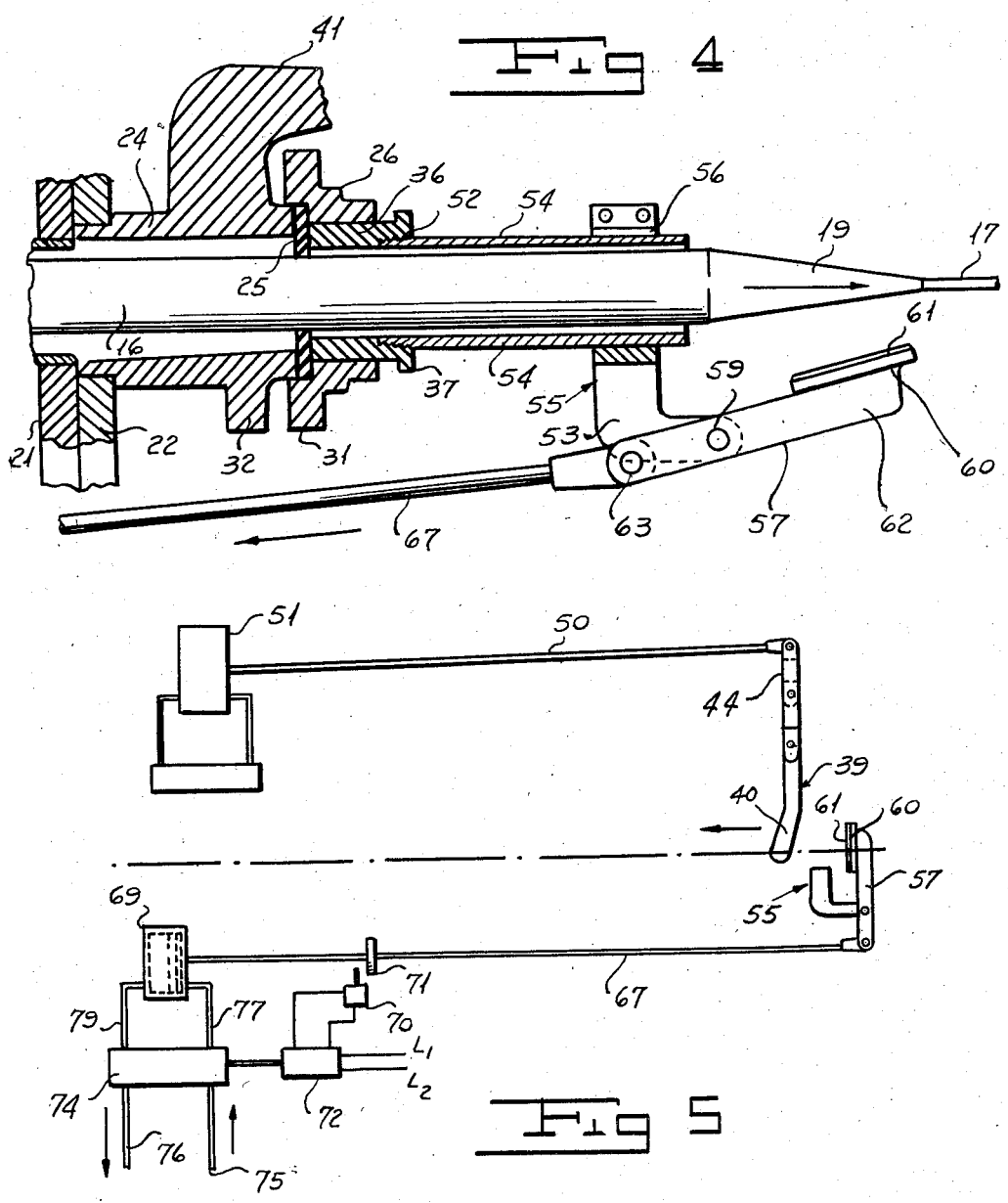

United States Patent Office 2,883,702
Patented Apr. 28, 1959

2,883,702

PULL-THROUGH LEADER SEAL

Jurian W. Van Riper, Ridgewood, N.J.

Application September 12, 1956, Serial No. 609,363

15 Claims. (Cl. 18—6)

This invention relates to apparatus for temporarily closing to a substantial extent the end of a pressure vessel through which a leader or pull-through cable passes.

In various types of material-treating apparatus, elongated material is treated in and withdrawn from a vessel or chamber under fluid pressure. Typical of such treating devices is a continuous vulcanizing apparatus in which elongated vulcanizable material, such as a sheathed cable is continuously fed through an elongated chamber containing steam under high pressure. See, for example, the patent to Ramsey et al., No. 2,561,820. After passing through the vulcanizing chamber, the material is usually fed into a cooling chamber, and then through an exit seal into the atmosphere.

Under steady operating conditions, in which the elongated material extends continuously from the entrance end of the vulcanizing chamber through the seal at the exit end of the cooling chamber, no particular difficulty is encountered in providing a reasonably tight seal between such material and the exit end of the cooling chamber. Difficulty arises, however, in starting a continuous vulcanizing operation. This involves the stringing up of the vulcanizing apparatus, that is, attaching a leader or pull-through cable to the forward end of the material and pulling the leader and the attached material through a chamber and out the exit seal.

Since a continuous vulcanizing device, including the steam filled vulcanizing chamber and the cooling portion thereof, is usually on the order of from 175 to 200 feet or more long, it is uneconomical not to vulcanize the leading end of the material as it is pulled through the chamber by the leader, particularly if the material is, for example, a large cable. In order that the elongated material shall be uniformly and properly vulcanized, it is necessary to maintain it under the optimum high pressure and high temperature conditions of the chosen vulcanizing cycle. The leader, however, is usually of a markedly smaller diameter than sheathed cable, so that a high rate of leakage of fluid occurs at the usual exit seal when only the leader is passing therethrough. The rate of leakage increases as the difference between the diameter of the material being treated and the leader increases. In fact, with material of large diameter, in many instances the leakage is so high during such stringing-up and initial vulcanizing operation as to exceed the capacity of the pump or other means provided at the exit seal, to maintain pressure within the vulcanizing chamber. With such high rate of leakage, the leading end of the vulcanizable material can not be uniformly and properly vulcanized.

In accordance with a preferred embodiment of the invention there is employed at the zone of the main exit seal an auxiliary sealing means which closes off to a substantial extent the opening between the leader and the passage through the main seal. Such auxiliary seal cuts down the rate of leakage at the exit seal to such an extent that such leakage is controllable, and the pressure and temperature within the vulcanizing chamber may be built up to the values which they attain under the steady operating conditions of the apparatus which exist when the material itself extends through and establishes a substantial seal with the main exit seal of the chamber.

The auxiliary seal of such preferred embodiment of the invention is removable from the path of the material through the exit seal, so that when the material itself reaches the exit zone of the chamber there is no obstruction to its free passage outwardly of the chamber. Preferably the auxiliary sealing means is so constructed as to be automatically movable out of the path of the material. When it is used with continuous vulcanizing apparatus, such as that shown in the above referred to patent, it is merely necessary to place the auxiliary seal in operative position, to engage the pull-through leader with the material-pulling capstan, to start the capstan and the extruding apparatus for sheathing the cable, and to admit steam and cooling fluid, where necessary, to the vulcanizing and cooling zones of the elongated chamber, respectively.

In the illustrative embodiment of the auxiliary seal of the invention is disclosed as employed at the exit end of a continuous vulcanizing apparatus, and the vulcanizable material is fed directly from the head of an extrusion machine, such head functioning as an entrance seal for the vulcanizing chamber. It will be understood, however, that in some continuous vulcanizing apparatus the vulcanizable material is not fed directly from the extrusion head to the vulcanizing chamber, but enters the chamber through a separate seal at the entrance end of the chamber. The auxiliary seal of the invention, within the broad teaching thereof, may also be used to advantage at the entrance end of a pressure chamber or vessel through which elongated material travels during treatment in the chamber.

The invention has among its objects the provision of a selectively used seal for a leader or pull-through cable in pressure-treating apparatus employed for treating elongated articles passing through a seal of such chamber.

The invention has among its objects, in a preferred embodiment thereof, the provision of a selectively used seal for a leader or pull-through cable in pressure-treating apparatus employed for treating elongated articles passing through the exit end of such chamber.

A further object of the invention resides in the provision of such selectively used seal for a leader in apparatus wherein there is a main seal for the material itself, and wherein the leader is of smaller diameter than the elongated material being treated.

Yet another object of the invention resides in the provision of an auxiliary seal of the character and for the purpose indicated, wherein the auxiliary seal is of simple, rugged construction and may be readily attached to existing apparatus for treating material with fluid under pressure while the material is being pulled through such apparatus.

A still further object of the invention resides in the provision of an auxiliary seal of the character and for the purpose indicated, wherein such seal is automatically operated to be retracted from the path of the material being treated when such material reaches a predetermined zone of the material treating chamber.

The above and further objects of the invention including economies of manufacture and use will more readily appear upon consideration of the following specification, and of the accompanying drawings forming a part thereof, in which:

Fig. 1 is a fragmentary view in perspective of a portion of a continuous vulcanizing chamber in the region of the exit end of the cooling zone thereof, such view showing the main exit seal on the chamber and the auxiliary leader or pull-through cable seal which is the subject of the present invention, the auxiliary seal being shown in operative position.

Fig. 2 is an enlarged fragmentary view, partially in side elevation and partially in vertical axial section, of the exit end of the vulcanizing chamber shown in Fig. 1 in the vicinity of the main and auxiliary seals thereon, the auxiliary seal being shown in operative position.

Fig. 3 is a view in end elevation of the auxiliary seal in operative position.

Fig. 4 is a fragmentary view, similar to Fig. 2, showing the auxiliary seal retracted into inoperative position, a sheathed cable being shown passing through the main exit seal of the apparatus.

Fig. 5 is a somewhat schematic view of the controls for the auxiliary sealing means, such controls being shown in combination with the controls for the main exit seal of the chamber.

In Fig. 1 there is shown somewhat diagrammatically the exit end of continuous vulcanizing apparatus such as that shown in the Ramsey et al. Patent No. 2,561,820. The portion of the cooling chamber there shown is generally designated 10, such portion being in the form of a tube, generally designated 11, which projects outwardly beyond the terminal end of a cooling jacket 12. Affixed to the outer end of tube 11 is a conventional main exit seal, generally designated 14, through which elongated material such as the cable 16 (Figs. 2 and 4) passes during the normal steady operation of the apparatus. Upon emerging through the exit seal 14, material 16 passes to a guiding means, not shown, positioned beyond the exit end of chamber 10 and then is returned lengthwise of and above the vulcanizing chamber, being guided by sheaves such as the one shown at 15 on its way to a take-up capstan, not shown, which is positioned rearwardly of the extrusion apparatus, likewise not shown, which sheaths the cable 16.

In stringing up the apparatus to start a vulcanizing run on a cable 16, a flexible pull-through leader or cable 17 is attached to the leading end of cable 16, by a splice 19, (Fig. 2), the splice being made in a conventional splicing box (not shown) which is interposed between the head of the extruding machine and the entrance end of the vulcanizing chamber. In such combined extruding and continuous vulcanizing apparatus, the extruding head of the extruding machine forms, in effect, the entrance seal for the vulcanizing apparatus. Consequently, there is little or no trouble with the entrance seal to the vulcanizing apparatus upon the start of a vulcanizing run, since the extruding machine is started a short time before vulcanizing fluid is admitted into the vulcanizing chamber. As can be seen in Fig. 2, however, where the leader cable 17 has a diameter markedly smaller than the diameter of the passage 27 through the main exit seal diaphragm 26, there remains a large unclosed area through the exit end of the vulcanizing chamber for the entire period that it takes the leading end of the cable 16 to travel through the chamber and pass through the diaphragm 26. The auxiliary sealing device, generally designated 20, provides for closing to a large extent the leakage area which would otherwise exist until the cable 16 passes through the main exit seal. Thereafter, the auxiliary seal is retracted so as to be withdrawn from the path of the cable as it travels through the exit end of the chamber.

Since the auxiliary seal of the invention is of particular advantage with existing main exit seals for continuous vulcanizing apparatus, the structure of such main seal and of the parts immediately cooperating therewith will now be described.

The main exit seal 14 has a main generally cylindrical body 24 which is attached by a flange 22 to a similar flange 21 on the end of tube 11. The outer end of body 24 has an annular end surface 25 against which the radially outer portion of conventional resilient sealing diaphragm member 26 is pressed. Member 26 is pressed against surface 25 by an annular outer body 29 having a counterbore therein as shown, body 29 being carried upon the outer end 24 of the body of the main seal.

Member 29 is guided by means of long studs 30 which are screwed into ears 32 on body 24, such long studs extending through ears 31 on the annular body 29. On each stud 30, outwardly of ear 31, there is screwed a long sleeve 34, sleeve 34 abutting under compression a shorter resilient sleeve 35 interposed between it and ear 31. Such structure allows the sealing diaphragm 26 to be held in place with a selected pressure exerted on its periphery by the member 29.

Mounted within member 29 so as to be slidable in a direction longitudinally of the vulcanizing and cooling chamber is a bushing 36 having an inner diameter slightly larger than the outer diameter of the sheathed cable 16. The inner end of sleeve 36 abuts and backs up the radially inner zone of the resilient diaphragm 26. Sleeve 36 is pressed inwardly against the member 26, after cable 16 has passed therethrough, by a lever system, now to be described, thrusting inwardly upon a flange 37 on the outer end of sleeve 36.

As shown in Figs. 2 and 3, member 24 has a forwardly projecting overarm 41 having laterally spaced ears 42 on its outer end. A vertical lever 39, having a bifurcated lower end 40, is mounted between ears 42 on overarm 41 by a pivot pin, as shown. The bifurcations on the lower end of lever 39 lie on opposite sides of flange 37 of sleeve 36, so as to thrust it longitudinally in a symmetrical manner. A second, shorter lever 44, having an end 45 pivotally attached to the ears 42 on overarm 41, cooperates with lever 39 to exert pressure upon diaphragm 26 by thrusting sleeve 36 to the left (Fig. 2). The levers 39 and 44, as well as the main sealing diaphragm 26 are conventional.

Power to move such lever system is supplied by means of an air cylinder 51 provided with a push-rod 50 the outer end of which is pivotally connected to the upper end of lever 44, as shown. While the apparatus is being strung, that is, before cable 16 has reached diaphragm 26, the piston of air cylinder 51 is retracted so that sleeve 36 is freed to move out slightly away from the diaphragm. When the cable 16 has passed through the sealing device 26, however, air cylinder 51 is energized to thrust sleeve 36 inwardly, thereby to cause the sealing diaphragm 26 tightly to engage cable 16.

The auxiliary sealing device 20 includes a tube 54, having an inner diameter substantially the same as the inner diameter of sleeve 36, and attached to the sleeve by as being threaded into a counterbore in the sleeve as indicated at 52. Tube 54 is thus, in effect, integral with bushing 36. The bushing and tube thus constitute an annular material-receiving member functioning as an extension of the vulcanizing and cooling chamber of the apparatus. The leader 17 and the cable 16 may thus pass freely through tube 54. Attached to the outer end of tube 54 is an L-shaped arm 55, having a split clamp portion 56 at its upper end surrounding tube 54. A lever 57, generally vertically disposed when the auxiliary seal is in operative position as shown in Fig. 2, is pivoted to the lower forwardly directed arm 53 of member 55 by a horizontal pivot pin 59. Member 57 carries on its upper end a centrally slotted flange 60 which carries a sealing gasket 61 on the face thereof confronting the end of tube 54, gasket 61 having a radial slit therein located centrally of the slotted flange 60, as best seen in Fig. 3. When flange 60 is in the operative position shown in Fig. 3, the gasket 61 fits closely about the leader 17, and the edges of the slit in the gasket abut or substantially abut each other, as shown. As shown in Fig. 3, the upper end of lever 57 is also slotted centrally, the upper arms on the lever carrying the flange 60. There is thus left an open slot 64 in the flange 60 and sealing gasket 61 whereby they clear and are free from the leader or pull-through cable 17 when lever 57 is rotated clockwise from its position in Fig. 2 to that shown in Fig. 4.

Lever 57 is swung selectively to bring it either into the operative position shown in Fig. 2 or the inoperative position shown in Fig. 4 by means of a double acting air motor 69, the piston rod of which is connected to a rod 67. Rod 67 has a fitting 66 thereon having an ear pivotally mounted between ears 65 on the lower end of lever 57 by pivot pin 63. It will be apparent that when the rod 67 is thrust to the right (Fig. 2) the auxiliary seal will be placed in operative position, and that when the rod 67 is pulled to the left the seal will be retracted into the inoperative position of Fig. 4.

The auxiliary seal can be retracted into inoperative position at the desired time. This can be performed by providing the leader or pull-through cable with a characteristic mark which indicates to an operator that the splice 19 is about to pass through the sealing diaphragm 26, thus enabling him to retract the device as the main exit seal becomes operative and in time to avoid damage to the cable from side rubbing contact with the auxiliary seal. For convenience of operation, however, it is desired to provide a means whereby the auxiliary sealing device is automatically retracted when the splice 19 approaches or is at the exit zone of the chamber.

As shown in Fig. 2, a sensitive switch such as a microswitch 70 is attached on a frame portion adjacent rod 67. A collar 71 is affixed to the rod in position to cooperate with the operating lever of switch 70, as shown, with the collar slightly rearwardly of such operating lever when the auxiliary sealing device is in operative position. As the leader or pull-through cable travels to the right (Figs. 2 and 4) it pulls with it the splice zone 19 and the leading end of cable 16. When splice 19 forcibly contacts the inner edges of slot 64 in the auxiliary sealing device, it will thrust lever 57 thereof clockwise a slight amount and thereupon push rod 67 to the left against the thrust of motor 69 sufficiently to trip switch 70. Such switch then actuates control mechanism for the auxiliary air motor 69 so as rapidly to retract the auxiliary sealing device into the inoperative position of Fig. 4.

As shown in Fig. 5, switch 70 controls a solenoid 72, which is energized by power leads $L_1$, $L_2$. Such solenoid controls a fluid reversing valve 74. When solenoid 72 is energized, valve 74 will be in such position that fluid under pressure, entering through pipe 75, enters motor 69 through pipe 79, thereby to thrust the piston of motor 69 to the right to place the auxiliary sealing device in operative position. When, however, solenoid 72 is de-energized by the tripping of switch 70 by collar 71, valve 74 is reciprocated so as to discharge fluid from the left-hand end of motor 69 through pipe 79 and to cause fluid under pressure to enter the right-hand end of such cylinder through pipe 77, thereby to retract the auxiliary sealing means.

Although the auxiliary sealing device does not completely close the opening at the exit end of the chamber existing around the pull-through leader or cable, as will be seen in Fig. 3, it markedly decreases the area which would have been left open and thus free to leak in the absence of such auxiliary sealing means. Such auxiliary sealing means reduces the leakage at the exit end of the chamber to a rate which the conventional pumping apparatus is capable of handling. Further, the leakage which occurs when the auxiliary seal is in operative position is not so great as to prevent the attainment of vulcanizing and cooling conditions in the treating chamber which thus equal those which exist when the apparatus is under normal steady operation. As a consequence, the use of the auxiliary sealing device of the invention permits the leading end of elongated material to be treated in the same manner as the remainder of the material.

As has been indicated above, the auxiliary or pull-through leader seal of the invention is capable of use to advantage when employed at the entrance end of a pressure-treating vessel, as, for example, at the entrance end of continuous vulcanizing apparatus in which the material enters through a separate seal on the apparatus. In such application of the auxiliary seal, it is conveniently mounted in advance of the main seal. Such auxiliary seal is held in open, inoperative position when the larger diametered vulcanizable material is passing through the entrance end of the apparatus. Immediately after the splice between the leader and the larger diametered vulcanizable material, such as a sheathed cable, has passed into the entrance end of the apparatus the auxiliary seal may be moved into operative position either by manually operated controls, or by a suitable automatic means which detects the approach of the material and then causes the actuating means for the auxiliary seal to move the latter into operative position wherein it forms a seal about the leader.

Whereas for purposes of illustration I have shown and described a preferred embodiment of a pull-through leader seal in accordance with the invention, it will be understood that such embodiment is illustrative only, since the invention is capable of considerable variation as to details. The invention is, therefore, to be defined by the scope of the claims appended hereto.

I claim as new the following:

1. Apparatus for treating elongated material which comprises a fluid containing chamber through which the material is drawn, a main seal at one zone of the chamber having a passage therethrough and adapted to cooperate with the material as it passes therethrough, and an auxiliary sealing means near said zone of the chamber in alignment with the main seal and appreciably spaced from the main seal in a direction along the path of travel of the material, said auxiliary sealing means having a passage therethrough appreciably smaller than that of the main seal for cooperating with an elongated member of markedly smaller diameter than the material joined to and aligned with the end of the material, the auxiliary sealing means comprising member-engaging means retractable from the path of travel of the material.

2. Apparatus for treating elongated material with fluid under pressure which comprises a fluid containing chamber from which the material is drawn, a main seal near the exit end of the chamber having a passage therethrough and adapted to cooperate with the material as it passes therethrough, and an auxiliary sealing means near the exit end of the chamber in alignment with the main seal and appreciably spaced from the main seal outwardly of the chamber, said auxiliary sealing means having a passage therethrough appreciably smaller than that through the main seal for cooperating with a pull-through leader which is of smaller diameter than the material and which is connected to and aligned with an end of the material, the auxiliary sealing means comprising leader-engaging means retractable from the path of travel of the material.

3. Apparatus for treating elongated material with fluid under pressure which comprises a fluid-containing chamber from which the material is drawn, a main seal near an end of the chamber having a passage therethrough and adapted to cooperate with the material as it passes therethrough, and an auxiliary sealing means near said end of the chamber and outwardly, of, in tandem with, and appreciably spaced from the main seal in a direction along the path of travel of the material, the auxiliary sealing means having a passage therethrough appreciably smaller than that through the main seal for cooperating with a pull-through leader which is of smaller diameter than the material and which is connected to and aligned with an end of the material, the auxiliary sealing means comprising leader-engaging means retractable from the path of travel of the material.

4. Apparatus for treating elongated material with fluid under pressure which comprises a fluid-containing chamber from which the material is drawn, a main seal near an end of the chamber having a passage therethrough and adapted to cooperate with the material as it passes therethrough, and an auxiliary sealing means near said end of the chamber in tandem with the main seal and spaced from the main seal in a direction along the path of travel of the material, the auxiliary sealing means having a passage therethrough appreciably smaller than that through the main seal for cooperating with a pull-through leader which is of smaller diameter than the material and which is connected to and aligned with an end of the material by a splice of substantial length, the auxiliary sealing means comprising leader-engaging means retractable from the path of travel of the material, the space between the main seal and the auxiliary sealing means being substantially equal to the length of the splice.

5. Apparatus for treating elongated material with fluid under pressure which comprises a fluid-containing chamber from which the material is drawn, a main seal near the exit end of the chamber having a passage therethrough and adapted to cooperate with the material as it passes therethrough, and an auxiliary sealing means near the exit end of the chamber and outwardly of, in tandem with, and appreciably spaced from the main seal, the auxiliary sealing means having a passage therethrough appreciably smaller than that through the main seal for cooperating with a pull-through leader which is of smaller diameter than the material and which is connected to and aligned with an end of the material, the auxiliary sealing means comprising leader-engaging means retractable from the path of travel of the material, and means mounting said auxiliary sealing means for movement from the operative position in which it is aligned with the main seal and engages the leader into an inoperative position laterally removed from the path of travel.

6. Apparatus for treating elongated material with fluid under pressure, which comprises a fluid containing chamber from which the material is drawn, a main seal near an end of the chamber having a passage therethrough and adapted to cooperate with the material as it passes therethrough, and an auxiliary sealing means near said end of the chamber and outwardly of, in tandem with, and appreciably spaced from the main seal in a direction along the path of travel of the material, the auxiliary sealing means having a passage therethrough appreciably smaller than that through the main seal for cooperating with a pull-through leader which is of smaller diameter than the material and which is connected to and aligned with an end of the material by a splice of appreciable length, the auxiliary sealing means comprising leader-engaging means retractable from the path of travel of the material, and means mounting said auxiliary sealing means for movement from the operative position in which it is aligned with the main seal and engages the leader into an inoperative position laterally removed from the path of travel, the space between the main seal and the auxiliary sealing means being substantially equal to the length of the splice.

7. Apparatus for treating elongated material with fluid under pressure which comprises a fluid containing chamber from which the material is drawn, a main seal at the exit end of the chamber having a passage therethrough and adapted to cooperate with the material as it passes therethrough, a longitudinally disposed tubular extension on the exit end of the chamber through which the material may pass, and a retractable auxiliary sealing means near the outer end of the tubular extension in tandem with and outwardly of the main seal, said auxiliary sealing means having a portion of such size as to cover the outer end of the tubular extension, such portion of the auxiliary sealing means having an opening therein of a width sufficient to receive a pull-through leader therethrough said opening having a width appreciably smaller than the diameter of the material, and means mounting the auxiliary sealing means for lateral movement out of the path of the material issuing from the chamber.

8. Apparatus for treating elongated material with fluid under pressure which comprises a fluid containing chamber from which the material is drawn, a main seal near an end of the chamber having a passage therethrough and adapted to cooperate with the material as it passes therethrough, and a retractable auxiliary sealing means near the end of the chamber in tandem with and outwardly of the main seal, said auxiliary sealing means having a portion of such size as to cover the outer end of the chamber, such portion of the auxiliary sealing means having a slot therein to receive a pull-through leader therethrough said slot having a width appreciably smaller than the width of the material, a lever extending generally radially inwardly of the exit zone of the chamber, said auxiliary sealing means being mounted on the inner end of the lever, means pivotally mounting the lever selectively to swing said auxiliary sealing means into operative position in alignment with the main seal and into inoperative position out of the path of the material, and means selectively to move the lever into either of said positions.

9. Apparatus for treating elongated material with fluid under pressure which comprises a fluid containing chamber from which the material is drawn, a main seal near an end of the chamber having a passage therethrough and adapted to cooperate with the material as it passes therethrough, said main seal comprising a resilient diaphragm having a generally central passage therethrough for the reception of the material, means including an outer material-receiving annular member for sealingly engaging the outer edge of the diaphragm, and a retractable auxiliary sealing means near the end of the chamber in tandem with and outwardly of the main seal, said auxiliary sealing means having a portion of such size as to cover the outer end of the annular member, such portion of the auxiliary sealing means having a slot therein to receive a pull-through leader therethrough said slot having a width appreciably smaller than the width of the material, and means mounting the auxiliary sealing means for movement out of the path of the material issuing from the chamber.

10. Apparatus for treating elongated material with fluid under pressure which comprises a fluid containing chamber from which the material is drawn, a main seal near an end of the chamber having a passage therethrough and adapted to cooperate with the material as it passes therethrough, said main seal comprising a resilient diaphragm having a generally central passage therethrough for the reception of the material, means including an outer material-receiving annular member for sealingly engaging the outer edge of the diaphragm, and a retractable auxiliary sealing means near the end of the chamber in tandem with and outwardly of the main seal, said auxiliary sealing means having a portion of such size as to cover the outer end of the annular member, such portion of the auxiliary sealing means having a slot therein to receive a pull-through leader therethrough said slot having a width appreciably smaller than the width of the material, a lever extending generally radially inwardly of the exit zone of the chamber, said auxiliary sealing means being mounted on the inner end of the lever, means pivotally mounting the lever selectively to swing said auxiliary sealing means into operative position in alignment with the main seal and into inoperative position out of the path of the material, and means selectively to move the lever into either of said positions.

11. Apparatus for treating elongated material with fluid under pressure which comprises a fluid containing chamber from which the material is drawn, a main seal near an end of the chamber having a passage therethrough and adapted to cooperate with the material as it passes therethrough, and a retractable auxiliary sealing means at the end of the chamber in tandem with and outwardly of the main seal, said auxiliary sealing means having a portion of such size as to cover the outer end of the chamber, such portion of the auxiliary sealing means having an opening therein of a width sufficient to receive a pull-through leader therethrough, means mounting the auxiliary sealing means for movement out of the path of the material issuing from the chamber, and means responsive to the arrival of the leading end of the material at the said end of the chamber for automatically actuating the last named means.

12. Apparatus for treating elongated material with fluid under pressure which comprises a fluid containing chamber from which the material is drawn, a main seal near the exit end of the chamber having a passage therethrough and adapted to cooperate with the material as it passes therethrough, and a retractable auxiliary sealing means near the exit end of the chamber in tandem with and outwardly of the main seal, said auxiliary sealing means having a portion of such size as to cover the outer end of the chamber, such portion of the auxiliary sealing means having an opening therein of a width sufficient to receive a pull-through leader therethrough, means mounting the auxiliary sealing means for movement out of the path of the material issuing from the chamber, and means responsive to the arrival of the leading end of the material at the exit end of the chamber for automatically actuating the last named means.

13. Apparatus for treating elongated material with fluid under pressure which comprises a fluid containing chamber from which the material is drawn, a main seal near an end of the chamber having a passage therethrough and adapted to cooperate with the material as it passes therethrough, and a retractable auxiliary sealing means near the end of the chamber in tandem with and outwardly of the main seal, said auxiliary seal having a portion of such size as to cover the outer end of the chamber, such portion of the auxiliary sealing means having a slot therein to receive a pull-through leader therethrough, a lever extending generally radially inwardly of the exit zone of the chamber, said portion of the auxiliary sealing means being mounted on the inner end of the lever, means pivotally mounting the lever selectively to swing said auxiliary sealing means into operative position in alignment with the main seal and into inoperative position out of the path of the material, means selectively to move the lever into either of said positions, and means responsive to the arrival of the leading end of the material at the said end of the chamber for automatically actuating the last named means to move the auxiliary sealing means into inoperative position.

14. Apparatus for treating elongated material with fluid under pressure which comprises a fluid containing chamber from which the material is drawn, a main seal near the exit end of the chamber having a passage therethrough and adapted to cooperate with the material as it passes therethrough, and a retractable auxiliary sealing means near the exit end of the chamber in tandem with and outwardly of the main seal, said auxiliary seal having a portion of such size as to cover the outer end of the chamber, such portion of the auxiliary sealing means having a slot therein of a width sufficient to receive a pull-through leader therethrough, a lever extending generally radially inwardly of the exit zone of the chamber, said portion of the auxiliary sealing means being mounted on the inner end of the lever, means pivotally mounting the lever selectively to swing said auxiliary sealing means into operative position in alignment with the main seal and into inoperative position out of the path of the material, means selectively to move the lever into either of said positions, and means responsive to the arrival of the leading end of the material at the exit end of the chamber for automatically actuating the last named means to move the auxiliary sealing means into inoperative position.

15. Apparatus for treating elongated material which comprises a fluid containing chamber through which the material is drawn, a main seal at one zone of the chamber having a passage therethrough and adapted to cooperate with the material as it passes therethrough, and an auxiliary sealing means near said zone of the chamber in alignment with the main seal and appreciably spaced from the main seal in a direction along the path of travel of the material, said auxiliary sealing means having a passage therethrough appreciably smaller than that of the main seal for cooperating with an elongated member of markedly smaller diameter than the material joined to and aligned with the end of the material, the auxiliary sealing means comprising means which forms a substantial seal with the elongated member, when the auxiliary sealing means is in operative sealing position, and which is retractable from the path of travel of the elongated material.

References Cited in the file of this patent

UNITED STATES PATENTS

| | | |
|---|---|---|
| 1,689,206 | Lamplough | Oct. 30, 1928 |
| 1,885,080 | Cherry et al. | Oct. 25, 1932 |
| 2,426,341 | Canfield | Aug. 26, 1947 |